US011764668B2

(12) United States Patent
Miyazaki et al.

(10) Patent No.: US 11,764,668 B2
(45) Date of Patent: Sep. 19, 2023

(54) CONTROL DEVICE FOR CONTROLLING AN ELECTRIC POWER CONVERSION DEVICE INCORPORATING A BIDIRECTIONAL INVERTER

(71) Applicant: Rohm Co., Ltd., Kyoto (JP)

(72) Inventors: Tatsuya Miyazaki, Kyoto (JP); Yuta Okawauchi, Kyoto (JP); Hirotaka Otake, Kyoto (JP); Mamoru Tsuruya, Saitama (JP)

(73) Assignee: Rohm Co., Ltd., Kyoto (JP)

( * ) Notice: Subject to any disclaimer, the term of this patent is extended or adjusted under 35 U.S.C. 154(b) by 195 days.

(21) Appl. No.: 17/294,112

(22) PCT Filed: Nov. 29, 2019

(86) PCT No.: PCT/JP2019/046755
§ 371 (c)(1),
(2) Date: May 14, 2021

(87) PCT Pub. No.: WO2020/116338
PCT Pub. Date: Jun. 11, 2020

(65) Prior Publication Data
US 2022/0021299 A1 Jan. 20, 2022

(30) Foreign Application Priority Data

Dec. 6, 2018 (JP) .................... 2018-228835
Nov. 27, 2019 (JP) .................... 2019-213942

(51) Int. Cl.
*H02M 1/42* (2007.01)
*H02M 3/335* (2006.01)
(Continued)

(52) U.S. Cl.
CPC ....... *H02M 1/4258* (2013.01); *H02M 1/0025* (2021.05); *H02M 1/4233* (2013.01);
(Continued)

(58) Field of Classification Search
CPC ............ H02M 1/4258; H02M 1/0025; H02M 1/4233; H02M 3/33584; H02M 7/162;
(Continued)

(56) References Cited

U.S. PATENT DOCUMENTS 5,757,099 A * 5/1998 Cheng ................. H02J 3/01
333/173
5,880,947 A * 3/1999 Imanaka ............... H02M 7/219
363/127
(Continued)

FOREIGN PATENT DOCUMENTS

CN 101174794 5/2008
EP 1919064 5/2008
(Continued)

OTHER PUBLICATIONS

PCT International Search Report in International Appln. No. PCT/JP2019/046755, dated Mar. 3, 2020, 4 pages (with English Translation).

*Primary Examiner* — Yusef A Ahmed
(74) *Attorney, Agent, or Firm* — Fish & Richardson P.C.

(57) ABSTRACT

An apparatus includes a control device configured to serve as a principal controlling agent in an electric power conversion device incorporating a switching circuit configured to be a bidirectional inverter. The control device is configured to subtract, from a reference signal that is determined in accordance with an operation mode of the electric power conversion device, a multiplied signal obtained by multiplying a control-target current of the switching circuit by a prescribed coefficient to generate, based on a result of the subtraction, a control signal for controlling the bidirectional inverter.

11 Claims, 11 Drawing Sheets

(51) Int. Cl.
  *H02M 1/00* (2006.01)
  *H02M 7/162* (2006.01)
  *H02M 7/5395* (2006.01)

(52) U.S. Cl.
  CPC ....... *H02M 3/33584* (2013.01); *H02M 7/162* (2013.01); *H02M 7/5395* (2013.01); *H02M 1/0012* (2021.05)

(58) Field of Classification Search
  CPC .. H02M 7/5395; H02M 1/0012; H02M 7/487; H02M 7/5387; H02M 7/797; Y02B 70/10
  See application file for complete search history.

(56) References Cited

U.S. PATENT DOCUMENTS

| | | | |
|---|---|---|---|
| 7,733,670 B2 * | 6/2010 | Feng | H02M 3/33584 |
| | | | 363/37 |
| 9,919,610 B1 * | 3/2018 | Sarwat | B60L 53/12 |
| 11,245,342 B2 * | 2/2022 | Otake | H02M 7/487 |
| 11,482,918 B2 * | 10/2022 | Okawauchi | H02M 3/158 |
| 2003/0146714 A1 * | 8/2003 | Buonocunto | H02J 9/065 |
| | | | 315/291 |
| 2006/0034104 A1 * | 2/2006 | Royak | H02M 1/4233 |
| | | | 363/39 |
| 2008/0062724 A1 * | 3/2008 | Feng | H02J 7/35 |
| | | | 307/66 |
| 2010/0131137 A1 * | 5/2010 | Iida | H02J 7/1423 |
| | | | 903/903 |
| 2012/0112713 A1 * | 5/2012 | Kuehn | H02J 3/24 |
| | | | 323/207 |
| 2012/0236612 A1 * | 9/2012 | Uno | H02M 1/36 |
| | | | 363/126 |
| 2014/0362623 A1 * | 12/2014 | Farkas | H02M 1/12 |
| | | | 363/97 |
| 2016/0268916 A1 * | 9/2016 | Ramsay | H04W 72/04 |
| 2017/0077836 A1 * | 3/2017 | Ginart | H02M 7/797 |
| 2018/0115180 A1 * | 4/2018 | Shin | H02P 27/06 |
| 2018/0278149 A1 * | 9/2018 | Sano | H02M 1/4225 |
| 2019/0157986 A1 * | 5/2019 | Ginart | H02M 3/158 |
| 2019/0243398 A1 * | 8/2019 | Hande | G01K 13/00 |
| 2020/0235655 A1 * | 7/2020 | Hayashi | H02J 9/06 |
| 2021/0234474 A1 * | 7/2021 | Otake | H02M 7/5395 |
| 2021/0296982 A1 * | 9/2021 | Hafezinasab | H02M 3/1582 |
| 2021/0399628 A1 * | 12/2021 | Yeo | H02M 1/36 |
| 2022/0115903 A1 * | 4/2022 | Abe | H02J 9/062 |
| 2022/0271650 A1 * | 8/2022 | Ishibashi | H02M 1/0058 |

FOREIGN PATENT DOCUMENTS

| | | |
|---|---|---|
| JP | 2005218252 | 8/2005 |
| JP | 2005348563 | 12/2005 |
| JP | 2008113514 | 5/2008 |
| JP | 2017189026 | 10/2017 |

* cited by examiner

CONTROL DEVICE FOR CONTROLLING AN ELECTRIC POWER CONVERSION DEVICE INCORPORATING A BIDIRECTIONAL INVERTER

TECHNICAL FIELD

The invention disclosed herein relates to electric power conversion devices and control devices for them.

BACKGROUND ART

Figure 11:
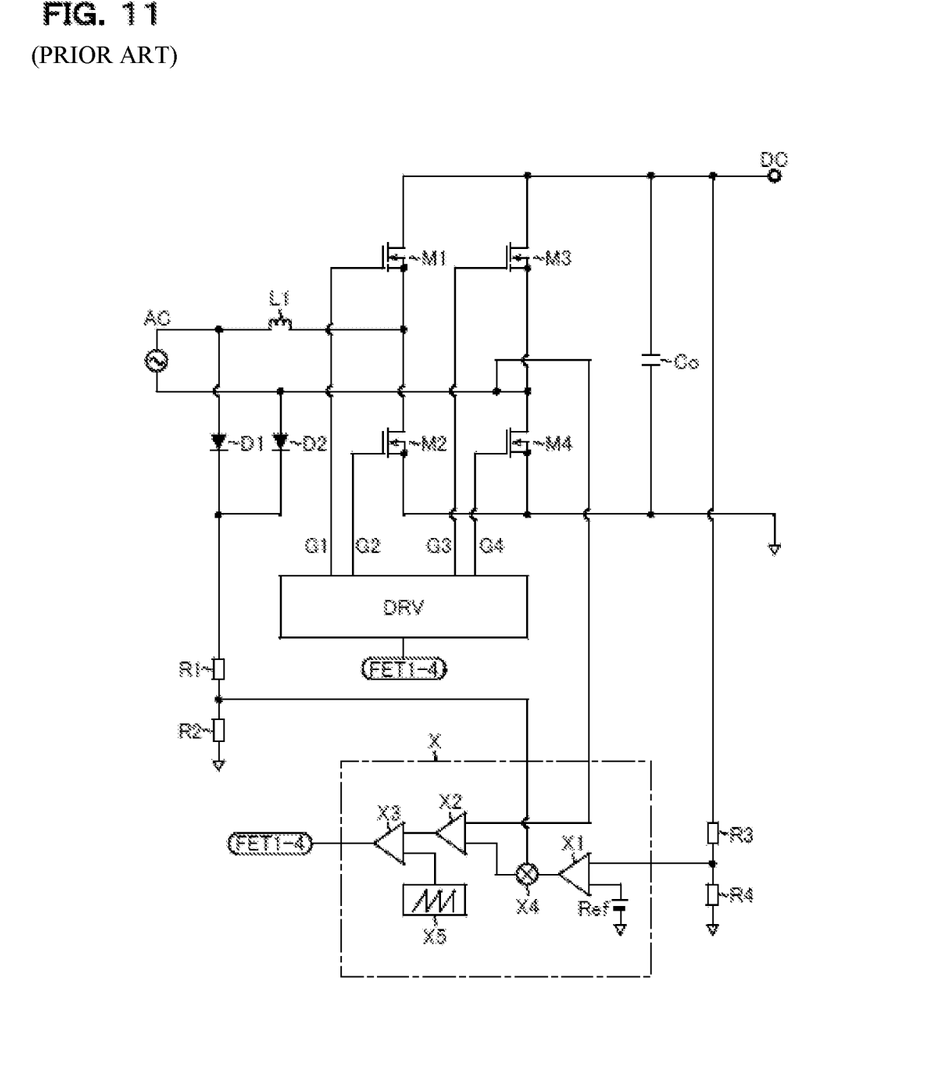
FIG. 11 is a diagram showing one known example of a PFC circuit.

FIG. 11 is a diagram showing one known example of a PFC (power factor correction) circuit that converts alternating-current electric power to direct-current electric power while achieving power-factor improvement. A PFC circuit generally includes, as the principal controlling agent, an analog control device X as shown in FIG. 11 that employs PI (proportional-integral) control to achieve negative feedback in accordance with the output voltage, the output current, and the input voltage.

LIST OF CITATIONS

Patent Literature

Patent Document 1: Japanese unexamined patent application publication No. 2005-218252

SUMMARY OF THE INVENTION

Problem to be Solved by the Invention

Inconveniently, the known analog control device X, since it employs PI control, exhibits large vibration until it reaches a steady state, and is therefore difficult to control. Moreover, it includes a voltage loop and a current loop, and thus requires two compensators (amplifiers X1 and X2), resulting in a large circuit scale. Furthermore, in a high-power PFC circuit of a diode-bridgeless type, it is difficult to generate a control signal commensurate with the input voltage by simple voltage division with resistors. This requires a transformer compatible with the commercial power frequency to be provided between the application terminal for the input voltage and the analog control device X, and this proves disadvantageous for size reduction and cost reduction. These problems cannot be solved simply by replacing the analog control device X with a digital control device so long as PI control is adopted.

On the other hand, as a known technology for solving the above problems, there has been proposed an analog control device that achieves negative feedback by detecting, instead of the input voltage, the input current (see, for example, Patent Document 1). Certainly this technology helps omit a compensator for current control and in addition does not require a control signal commensurate with the input voltage. This is advantageous in terms of feedback loop adjustment and circuit scale.

However, the analog control device of Patent Document 1 is directed to a PFC circuit after all: it cannot be used as it is, for example, as the principal controlling agent in a bidirectional inverter, that is, a circuit that achieves both AC-DC conversion (PFC operation) and DC-AC conversion (INV [inverter] operation) by switching the input and output of a single switching circuit.

In view of the above-mentioned problems encountered by the present inventors, an object of the invention disclosed herein is to provide a control device that can control both an AC-DC conversion circuit (PFC circuit) and a DC-AC conversion circuit (inverter), and to provide an electric power conversion device that employs such a control device.

Means for Solving the Problem

According to one aspect of what is disclosed herein, a control device is configured to serve as a principal controlling agent in an electric power conversion device incorporating a switching circuit including a transistor. The control device is configured to subtract, from a reference signal that is determined in accordance with an operation mode of the electric power conversion device, a multiplied signal obtained by multiplying a control-target current of the switching circuit by a prescribed coefficient to generate, based on the result of the subtraction, a control signal for the transistor (a first configuration).

In the control device according to the first configuration, preferably, the switching circuit is configured to be a PFC circuit, the reference signal is configured to have a constant value, and the control-target current is configured to be an input current (a second configuration).

In the control device according to the first configuration, preferably, the switching circuit is configured to be an inverter, the reference signal is configured to be a sine wave signal, and the control-target current is configured to be an output current (a third configuration).

In the control device according to the first configuration, preferably, the switching circuit is configured to be a bidirectional inverter; the waveform of the reference signal is configured to be changed when an energizing direction is switched so that, during AC-DC conversion, the reference signal has a constant value and, during DC-AC conversion, the reference signal is a sine wave signal; and, as the control-target current, the current passing at the same node in the switching circuit is configured to be monitored both during AC-DC and DC-AC conversion such that the control-target current is an input current during AC-DC conversion and is an output current during DC-AC conversion (a fourth configuration).

The control device according to the second or fourth configuration is, preferably, further configured to superimpose on the reference signal a modulation signal for generating a distortion in the input current (a fifth configuration).

The control device according to the third or fourth configuration is, preferably, further configured to superimpose on the reference signal a modulation signal for canceling out a distortion in the load current passing from a commercial power source through another load (a sixth configuration).

In the control device according to the third or fourth configuration, preferably, the frequency of the reference signal is configured to be a frequency required in the output current, and the coefficient is configured to be a value that makes the multiplied signal negligibly low compared with the reference signal (a seventh configuration).

According to another aspect of what is disclosed herein, a bidirectional inverter includes: a capacitor bridge configured to include at least two capacitors connected in series between first and second DC nodes; first and second transistor bridges each configured to include two transistors connected in series between the first and second DC nodes; first and second bidirectional switches configured to be connected between a midpoint node of the capacitor bridge and output nodes of the first and second transistor bridges respectively; a transformer configured to be connected to output nodes of the first and second transistor bridges; a reactor configured to be connected between the transformer and an AC node; and a capacitor configured to be connected between the AC node and the midpoint node of the capacitor bridge. The first and second transistor bridges are configured to be operated with a 180 degree phase difference between them (an eighth configuration).

In the bidirectional inverter according to the eighth configuration, the first and second transistor bridges, the first and second bidirectional switches, the transformer, the reactor, and the capacitor are configured in three phases (a ninth configuration).

In the bidirectional inverter according to the eighth or ninth configuration, preferably, the transformer and the reactor are configured as a transformer-coupled reactor having functions of both of them (a tenth configuration).

In the bidirectional inverter according to any one of the eighth to ninth configurations, preferably, the transistor and the first and second bidirectional switches are each formed of a wide-band-gap semiconductor (an eleventh configuration).

According to yet another aspect of what is disclosed herein, an electric power conversion device includes: a bidirectional inverter according to any one of the eighth to eleventh configurations; and a control device according to any one of the first to eighth configurations which is configured to serve as a principal controlling agent in the bidirectional inverter (a twelfth configuration).

Advantageous Effects of the Invention

According to the invention disclosed herein, it is possible to provide a control device that can control both an AC-DC conversion circuit (PFC circuit) and a DC-AC conversion circuit (inverter), and to provide an electric power conversion device that employs such a control device

DESCRIPTION OF EMBODIMENTS

Electric Power Conversion Device (First Embodiment)

Figure 1:
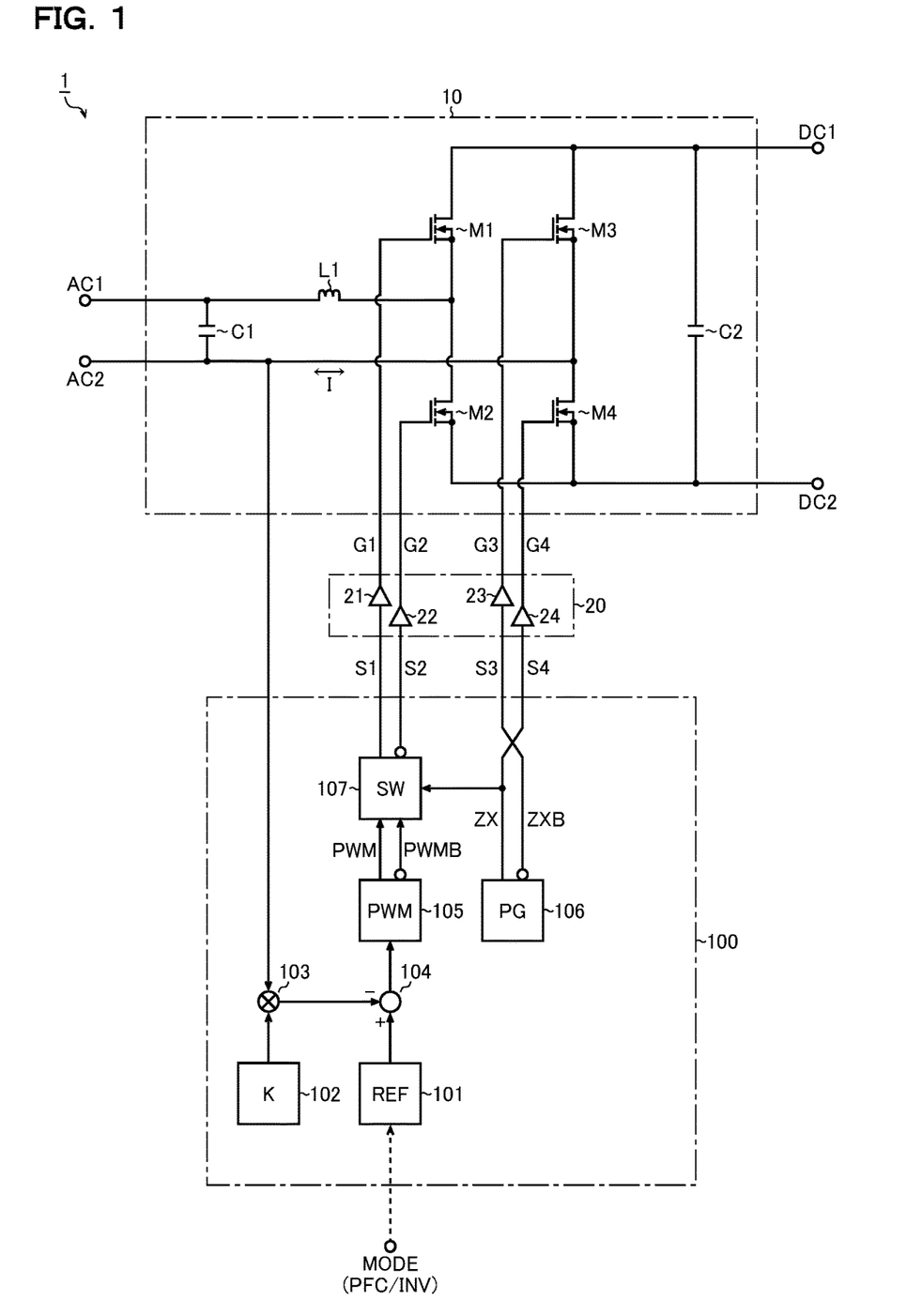
FIG. 1 is a diagram showing one example of an electric power conversion device according to a first embodiment.

FIG. 1 is a diagram showing one example of an electric power conversion device according to a first embodiment.

The electric power conversion device 1 of the first embodiment includes a switching circuit 10, a driving circuit 20, and a digital control device 100.

The switching circuit 10 is a bidirectional inverter that, by switching input and output (that is, by switching the energizing direction), achieves both AC-DC conversion (PFC operation) and DC-AC conversion (INV operation). The switching circuit 10 includes transistors M1 to M4 (all n-channel MOSFETs in FIG. 1), capacitors C1 and C2, and an inductor L1.

The respective drains of the transistors M1 and M3 are connected to a node DC1. The source of the transistor M1 and the drain of the transistor M2 are connected to the first terminal of the inductor L1. The second terminal of the inductor L1 is connected to a node AC1. The source of the transistor M3 and the drain of the transistor M4 are connected to a node AC2. The respective sources of the transistors M2 and M4 are connected to a node DC2. The capacitor C1 is connected between the nodes AC1 and AC2. The capacitor C2 is connected between the nodes DC1 and DC2.

The respective gates of the transistors M1 to M4 are fed with gate signals G1 and G4 respectively. The transistors M1 and M4 are respectively on when the gate signals G1 to G4 are at high level, and are respectively off when the gate signals G1 to G4 are at low level. The transistors M1 and M2 turn on and off complementarily in accordance with the gate signals G1 and G2 respectively. The transistors M3 and M4 turn on and off complementarily in accordance with the gate signals G3 and G4 respectively. In the present disclosure, the term "complementarily" should be understood to cover not only operation where the on/off states of the transistors involved are completely reversed, but also operation where a simultaneously-off period (what is called a dead time) is provided for preventing a through current.

The driving circuit 20 is a circuit block for generating the gate signals G1 to G4 in accordance with control signals S1 to S4, and includes gate drivers 21 to 24. The gate drivers 21 to 24 respectively increase the current capacity of the control signals S1 to S4 to generate the gate signals G1 to G4.

The digital control device 100 is the principal controlling agent in the switching circuit 10 (and hence the whole electric power conversion device 1), and includes, as various functional blocks, a reference signal setter 101, a coefficient setter 102, a multiplier 103, an adder 104, a pulse width modulator 105, a zero-cross detector 106, and a signal switcher 107. These functional blocks are implemented on a software basis by control programs run on the digital control device 100. The digital control device 100 may be replaced with an analog control device having equivalent functions.

The reference signal setter 101 determines a reference signal REF in accordance with an operation mode setting signal MODE (a control signal for switching the operation mode of the electric power conversion device 1 to either PFC operation or INV operation).

The coefficient setter 102 determines a coefficient K and outputs it to the multiplier 103.

The multiplier 103 multiplies the control-target current I passing through the switching circuit 10 (at the node AC2 in FIG. 1) by the coefficient K to output a multiplied signal (=K×I). The digital control device 100 monitors, as the control-target current I, the current passing at the same node (node AC2 in FIG. 1) in the switching circuit 10 both during PFC operation (AC-DC conversion) and INV operation (DC-AC conversion). As will be described in detail later, during PFC operation (AC-DC conversion), the control-target current I is an input current Iin and, during INV operation (DC-AC conversion), the control-target current I is an output current Iout.

The adder 104 (in the example of FIG. 1, the subtracter) subtracts from the reference signal REF the multiplied signal (=K×I) to output a differential signal (=REF−K×I).

The pulse width modulator 105 compares the differential signal (=REF−K×I) with a slope signal (unillustrated) with a triangular or sawtooth-shaped waveform to output a pulse width modulation signal PWM (and an inverted pulse width modulation signal PWMB with the inverted logic level compared with it).

The zero-cross detector 106 detects the polarity reversal time point (zero-cross time point) of an alternating-current voltage (i.e., the input voltage Vin during PFC operation or the output voltage Vout during INV operation) which is applied between the nodes AC1 and AC2 to generate a zero-cross signal ZX (and an inverted zero-cross signal ZXB with the inverted logic level compared with it) in synchronization with the polarity reversal. More specifically, the zero-cross signal ZX is at high level when the alternating-current voltage has a positive polarity and is at low level when the alternating-current voltage has a negative polarity. Thus, when the alternating-current voltage is a commercial alternating-current voltage in Japan, the zero-cross signal ZX is a pulse signal of 50 Hz or 60 Hz. One of the zero-cross signal ZX and the inverted zero-cross signal ZXB is output as the control signal S3, and the other of them is output as the control signal S4. The polarity reversal time point of the alternating-current voltage can be detected using a photocoupler or the like.

The signal switcher 107 outputs, in accordance with the zero-cross signal ZX, one of the pulse width modulation PWM and the inverting pulse width modulation signal PWMB as the control signal S1. The signal switcher 107 outputs also the control signal S2 (S1B) with the inverted logic level compared with the control signal S1. Thus, for example, when ZX=L, S1=PWM and S2=PWMB. On the other hand, when ZX=H, S1=PWMB and S2=OWM.

In this way, the digital control device 100 subtracts, from the reference signal RES that is determined in accordance with the operation mode of the electric power conversion device 1 (i.e., the operation mode setting signal MODE), the multiplied signal (K×I) obtained by multiplying the control-target current I of the switching circuit 10 by a prescribed coefficient K to generate, based on the calculation result (=REF−K×I), the control signals S1 and S2 for the transistors M1 and M2. The PFC operation and the INV operation in the electric power conversion device 1 will be discussed separately and specifically below.

<PFC Operation (AC to DC)>

Figure 2:
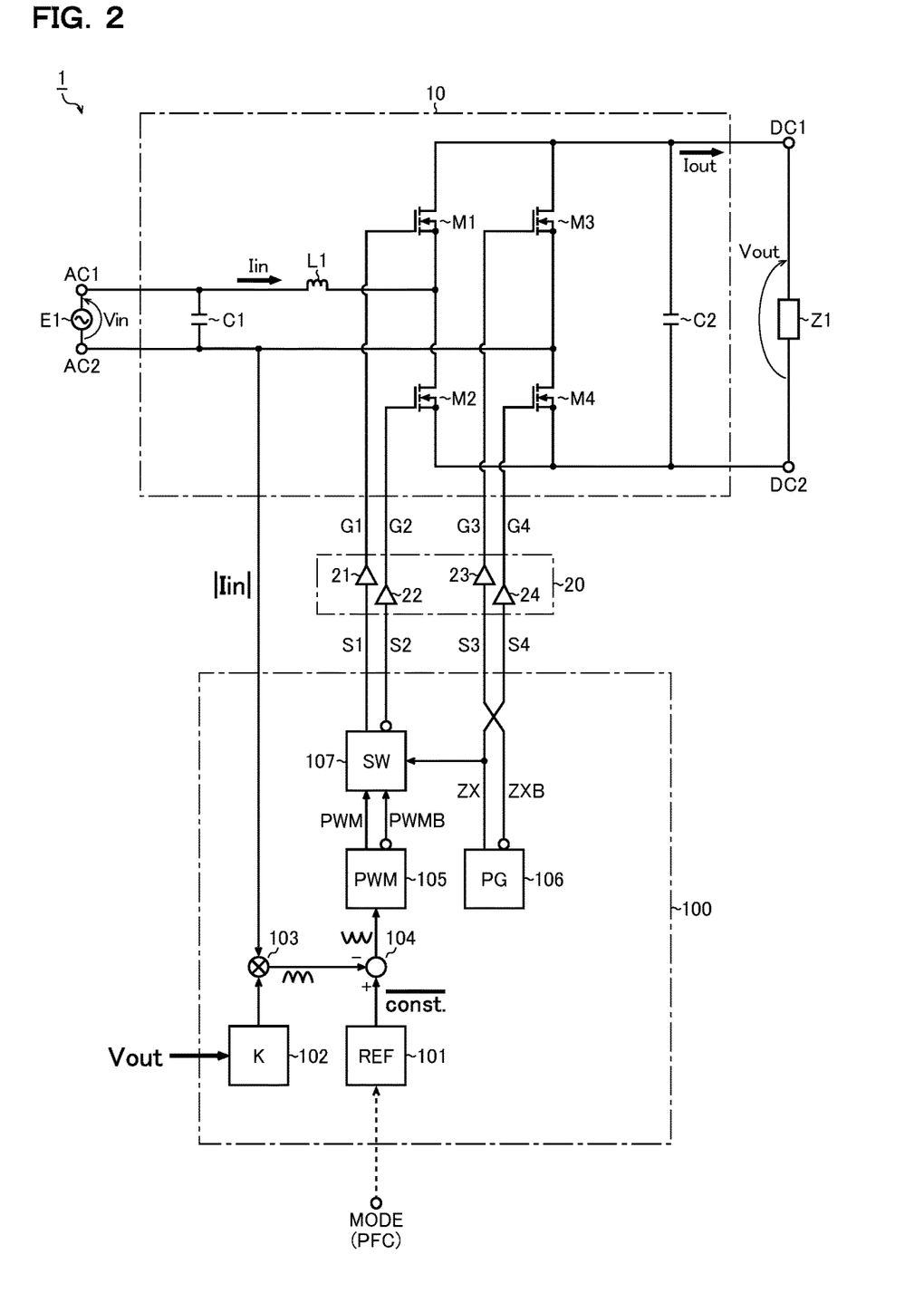
FIG. 2 is a diagram showing one example of PFC operation (AC to DC)

FIG. 2 is a diagram showing one example of the PFC operation (AC to DC) in the electric power conversion device 1. In FIG. 2, an alternating-current power source E1 that supplies alternating-current electric power (an input voltage Vin, an input current Iin) is connected between the nodes AC1 and AC2. Between the nodes DC1 and DC2, a direct-current load Z1 that is supplied with direct-current electric power (an output voltage Vout, an output current Iout) is connected. Here, the switching circuit 10 functions as a PFC circuit (boosting converter) which converts alternating-current electric power into direct-current electric power.

As shown in FIG. 2, during PFC operation, the reference signal REF is determined at a constant value, and the input current |Iin| (i.e., the absolute value of the input voltage Iin) is input as the control-target current. The coefficient K is variably controlled such that the output voltage Vout remains at a constant value. More specifically, the coefficient K can be variably controlled in accordance with, for example, the difference between a resistor-divided value of the output voltage Vout and a predetermined target output value.

During PFC operation, only the transistors M1 and M2 are operated on a PWM basis, while the transistors M3 and M4 are kept off to be used as diodes. It is thus possible to keep the direction of current constant and to prevent a reverse current. For higher efficiency, the transistors M3 and M4 are operated at a low frequency. In this case, the zero-cross signal ZX is output as the control signal S4, and the inverted zero-cross signal ZXB is output as the control signal S3. As a result, one of the transistors M3 and M4 (only the switch for storing electric power in the reactor L1) is operated.

Next, the principle of PFC operation will be described. Let the input voltage be Vin, the output voltage be Vout, the switching period be T, and the on-period and the off-period of the transistor be Ton and Toff respectively (here, the on-period is defined with respect to a driving-side transistor, which is off when the return-side transistor is in a conducting state), then the following formulae (1) to (3) hold:

$$Vin \times Ton = (Vout - Vin) \times Toff \qquad (1)$$

$$Vin \times (T - Toff) = (Vout - Vin) \times Toff \qquad (2)$$

$$Vin \times T = Vout \times Toff \qquad (3)$$

From formula (3) above it is seen that, if the switching period T and the output voltage Vout are constant, the input voltage Vin is proportional to the off-period Toff. Here, if the input current Iin has the same waveform as the input voltage Vin, also the input current Iin should be proportional to the off-period Toff. Thus, by controlling the input current Iin such that it is proportional to the off-period Toff, it is possible to obtain the input current Iin with the same waveform as the input voltage Vin. In addition, by setting the coefficient K such that the output voltage Vout remains constant, it is possible to achieve PFC operation.

Figure 3:
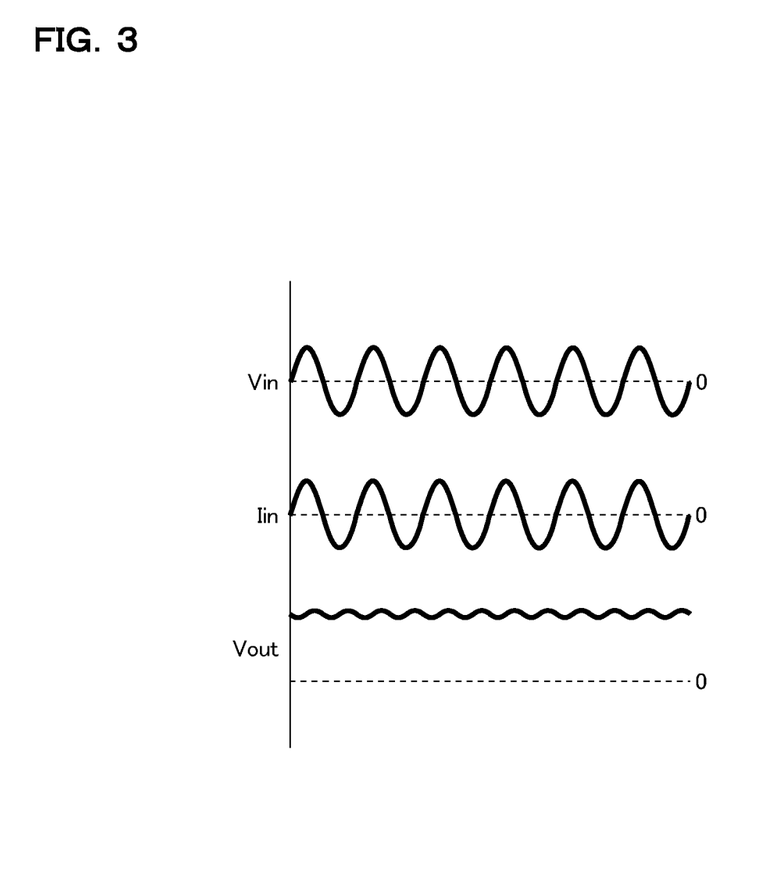
FIG. 3 is a diagram showing input and output waveforms during PFC operation.

FIG. 3 is a diagram showing the input and output waveforms during PFC operation, illustrating, from top down, the input voltage Vin, the input current Iin, and the output voltage Vout. As will be seen from FIG. 3, through the PFC operation of the electric power conversion device 1, alternating-current electric power is converted into direct-current electric power.

<INV Operation (DC to AC)>

Figure 4:
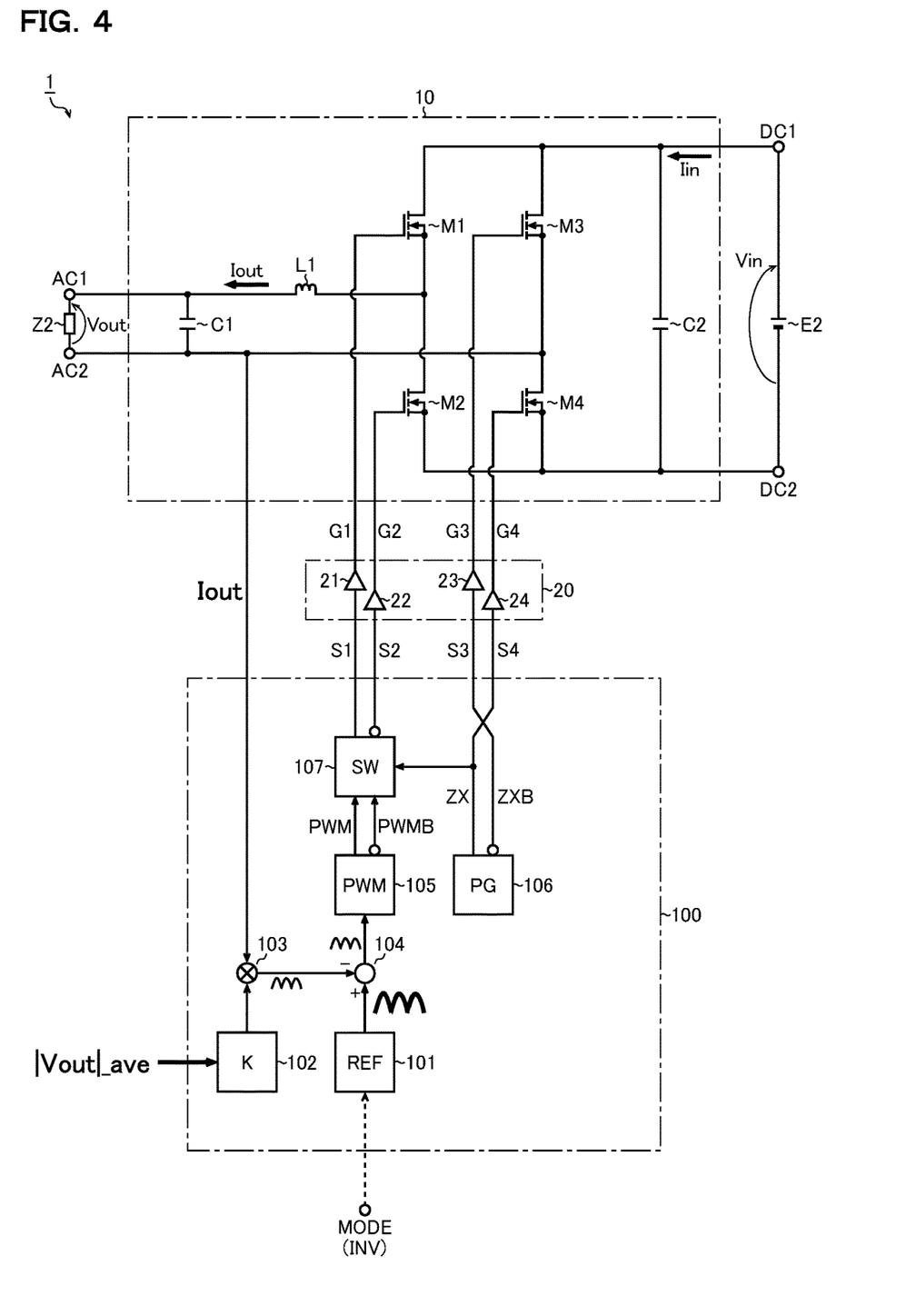
FIG. 4 is a diagram showing one example of INV operation (DC to AC)

FIG. 4 is a diagram showing one example of INV operation (DC to AC) in the electric power conversion device 1. In FIG. 4, a direct-current power source E2 that supplies direct-current electric power (an input voltage Vin, an input current Iin) is connected between the nodes DC1 and DC2. Between the nodes AC1 and AC2, an alternating-current load Z2 that is fed with an alternating-current (an output voltage Vout, an output current Iout) is connected. That is, the input and output of the switching circuit 10 are reversed compared with what is shown in FIG. 2 referred to previously. Here, the switching circuit 10 functions as an inverter which converts direct-current electric power into alternating-current electric power.

As shown in FIG. 4, during INV operation, for example, the reference signal REF is determined to be a sine wave signal (or a full-wave rectified sine wave signal), and the output current |Iout| (i.e., the absolute value of the output voltage Iout) is input as the control-target current. In the case of a regeneration inverter where regenerated electric power is returned to an alternating-current power source, the reference signal REF can be determined to be in synchronization with the zero-cross signal ZX. On the other hand, in the case of an independent inverter, a sine wave signal of a desired frequency can be generated. The coefficient K is variably controlled such that the output voltage |Vout|_ave (i.e., the absolute average value of the output voltage Vout) remains at a constant value. More specifically, the coefficient K can be variably controlled in accordance with, for example, the difference between the average value of the full-wave rectified output voltage Vout and a predetermined target output value. During INV operation, the inverted zero-cross signal ZXB is output as the control signal S3 and the zero-cross signal ZX is output as the control signal S4. This is merely one example of operation and is not meant as any limitation; any control can be adopted so long as it outputs a sine wave.

Next, the principle of INV operation will be described. Let the input voltage be Vin, the output voltage be Vout, the switching period be T, and the on-period and the off-period of the transistor be Ton and Toff respectively (here, the on-period is defined with respect to a driving-side transistor, which is off when the return-side transistor is in a conducting state), then the following formulae (4) to (6) hold:

$$(Vin - Vout) \times Ton = Vout \times Toff \qquad (4)$$

$$(Vin - Vout) \times Ton = Vout \times (T - Ton) \qquad (5)$$

$$Vin \times Ton = Vout \times T \qquad (6)$$

From formula (6) above it is seen that, if the switching period T and the input voltage Vin are constant, the output voltage Vout is proportional to the on-period Ton. Thus, in the case of an independent inverter, if the output current Iout has the same waveform as the output voltage Vout, also the output current Iout should be proportional to the on-period Ton. Thus, by controlling the output current Iout such that it is proportional to the on-period Ton, it is possible to obtain the output current Iout with the same waveform as the output voltage Vout. With this control, however, as the output current Iout increases, the on-period Ton becomes longer proportionally. This is positive feedback control, which makes INV operation impossible.

Thus, when the output current Iout increases, it is necessary to shorten the on-period Ton. To achieve such negative feedback control, the reference signal REF can be determined to have the same waveform (a sine wave when the output voltage Vout has a sine wave) as the output voltage Vout in advance and the on-period Ton can be controlled based on the differential signal (=REF−K×Iout) obtained by subtracting from the reference signal REF the multiplied signal (=K×Iout) which is proportional to the output current Iout.

The reference signal REF is a sine wave. If the output current Iout is a sine wave, the multiplied signal (=K×Iout) which is proportional to it is also a sine wave. Thus, also the differential signal (=REF−K×Iout) obtained by subtracting from the reference signal REF the multiplied signal (=K×Iout) is a sine wave, and thus the output current Iout which is controlled based on the differential signal is also a sine wave. In this case, as the output current Iout increases, the on-period Ton is shortened. Thus, negative feedback control is achieved, which makes stable INV operation possible. It is also possible to adjust the output current Iout by changing the coefficient K.

When the electric power conversion device 1 is used as a regeneration inverter (i.e., a power system interconnection inverter for interconnection with a commercial alternating-current power supply system), it is operated with the reference signal REF generated by detecting the zero crossing and the polarity of the alternating-current voltage. In a case where the output voltage of the regeneration inverter is soft-started, by operating only the switches for feeding out electric power while keeping off the other switches, it is possible to achieve a safe start-up without causing a reverse current. It is also possible to reduce loss by, after the output voltage becomes equal to a predetermined voltage (i.e., the voltage value of the connected alternating-current), performing synchronous rectification with the other switches.

On the other hand, when the electric power conversion device 1 is used as an independent inverter (i.e., a common inverter connected to an alternating-current load Z2), the frequency of the reference signal REF can be determine to be, in accordance with the specification of the alternating-current load Z2, a frequency required in the output current Iout. The coefficient K can be determined to be a value that makes the multiplied signal (=K×Iout) negligibly low (for example, K=0) compared with the reference signal REF.

Figure 5:
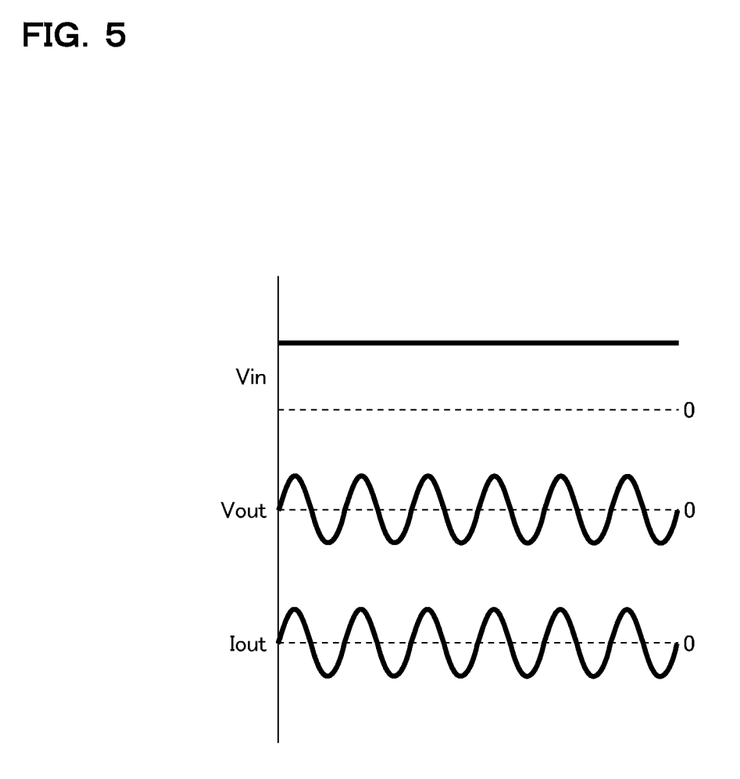
FIG. 5 is a diagram showing input and output waveforms during INV operation.

FIG. 5 is a diagram showing the input and output waveforms during INV operation, illustrating, from top down, the input voltage Vin, the output voltage Vout, and the output current Iout. As shown in FIG. 5, through the INV operation of the electric power conversion device 1, direct-current electric power is converted into alternating-current electric power.

<Operation Mode Switching (PFC/INV)>

As described above, the digital control device 100 has a function of changing the waveform of the reference signal REF dynamically when switching the energizing direction so that, in accordance with the operation mode setting signal MODE, the reference signal REF remains at a constant value during the PFC operation (AC-DC conversion) of the switching circuit 10 and the reference signal REF is a sine wave signal during the INV operation (DC-AC conversion) of the switching circuit 10.

With this function, it is possible to make the switching circuit 10 operate as a bidirectional inverter, and thus it is possible, for example, to convert alternating-current electric power supplied from a commercial alternating-current source into direct-current electric power to charge a battery or, reversely, to convert direct-current electric power generated by a solar cell into alternating-current electric power for regeneration to the commercial alternating-current power source. It is also possible to cope with parallel operation and hot swapping.

The operation mode does not necessarily need to be switched dynamically. For example, when the switching circuit 10 is used only as a PFC circuit, the reference signal REF can be fixed at a constant value, and when the switching circuit 10 is used only as a unidirectional inverter, the reference signal REF can be fixed to be a sine wave signal.

<Modulation of Reference Signal>

Figure 6:
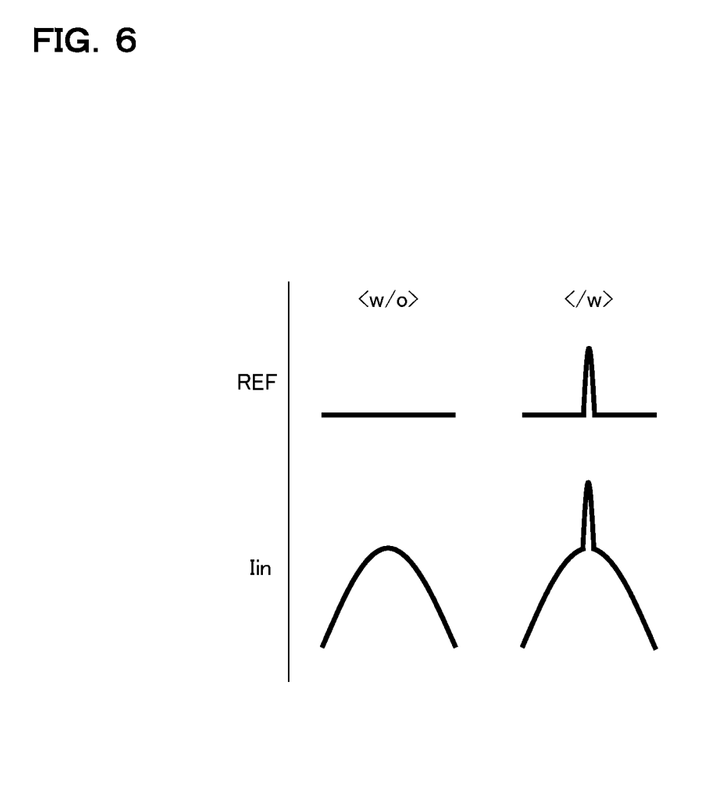
FIG. 6 is a diagram showing a first modulation example of a reference signal.

FIG. 6 is a diagram showing a first modulation example of the reference signal REF during PFC operation (AC-DC conversion), illustrating, from top down, the reference signal REF and the input current Iin. FIG. 6 shows, at left, the waveforms observed when the reference signal REF is not modulated and at right, the waveforms observed when the reference signal REF is modulated.

In a case where an intentional distortion component needs to be generated in the input current Iin, a modulation signal (i.e., a modulation component corresponding to the difference between the sine wave current waveform and the desired current waveform) for producing the distortion component in the input current Iin can be superposed on the reference signal REF. With such modulation, it is possible to use the electric power conversion device 1 as, for example, an alternating current electronic loading device for use in a dummy current load test or the like.

Figure 7:
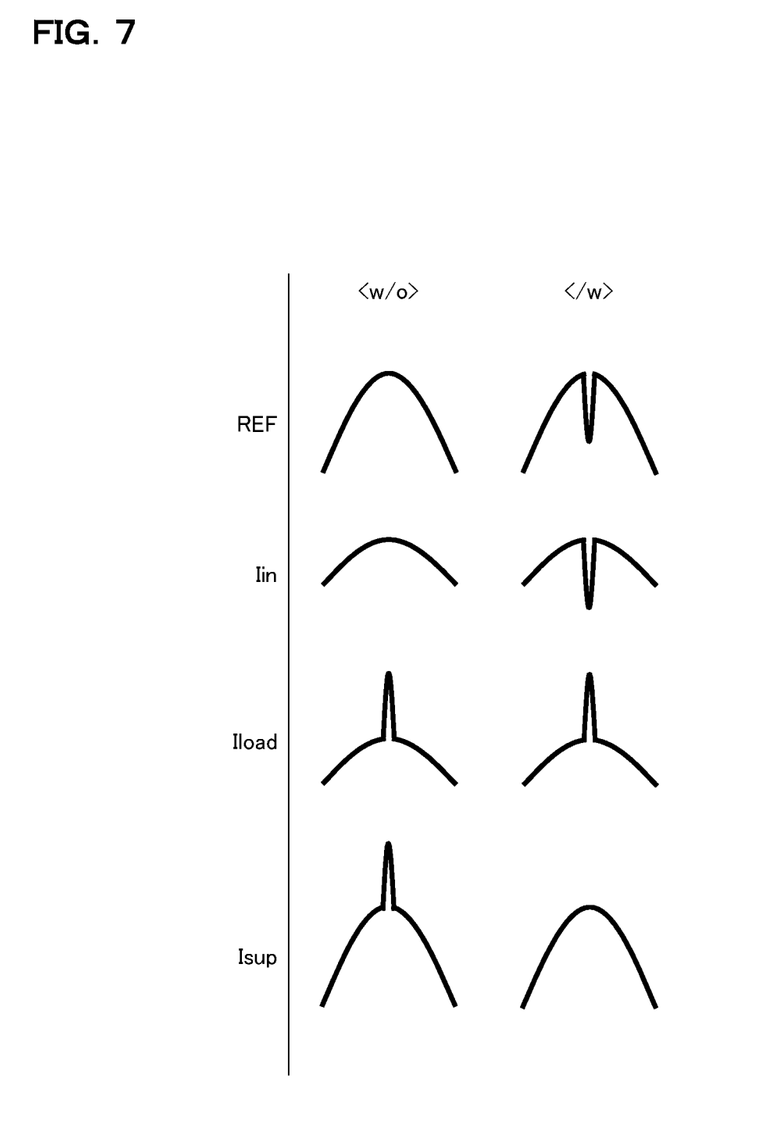
FIG. 7 is a diagram showing a second modulation example of a reference signal.

FIG. 7 is a diagram showing a second modulation example of the reference signal REF during INV operation (in particular, when the regeneration inverter is used as a distortion correction device), illustrating, from top down, the reference signal REF, the input current Iin supplied from the commercial power source to the regeneration inverter, the load current Iload passing through another load, and the total supply current Isup from the commercial power source. FIG. 7 shows, at left, the waveforms observed when the reference signal REF is not modulated and, at right, the waveforms observed when the reference signal REF is modulated.

When an unintended distortion component is generated in the load current Iload, a modulation signal (i.e., a modulation component for passing a current reverse to the just-mentioned distortion component) for canceling out the distortion component is superposed on the reference signal REF to generate an intended distortion component also in the input current Iin. Adding up the input current Iin and the load current Iload results in the total supply current Isup being a sine wave current. With such modulation, it is possible, for example, to suppress higher harmonic components in the load current Iload to prevent a distorted current from being fed out.

Electric Power Conversion Device (Second Embodiment)

Figure 8:
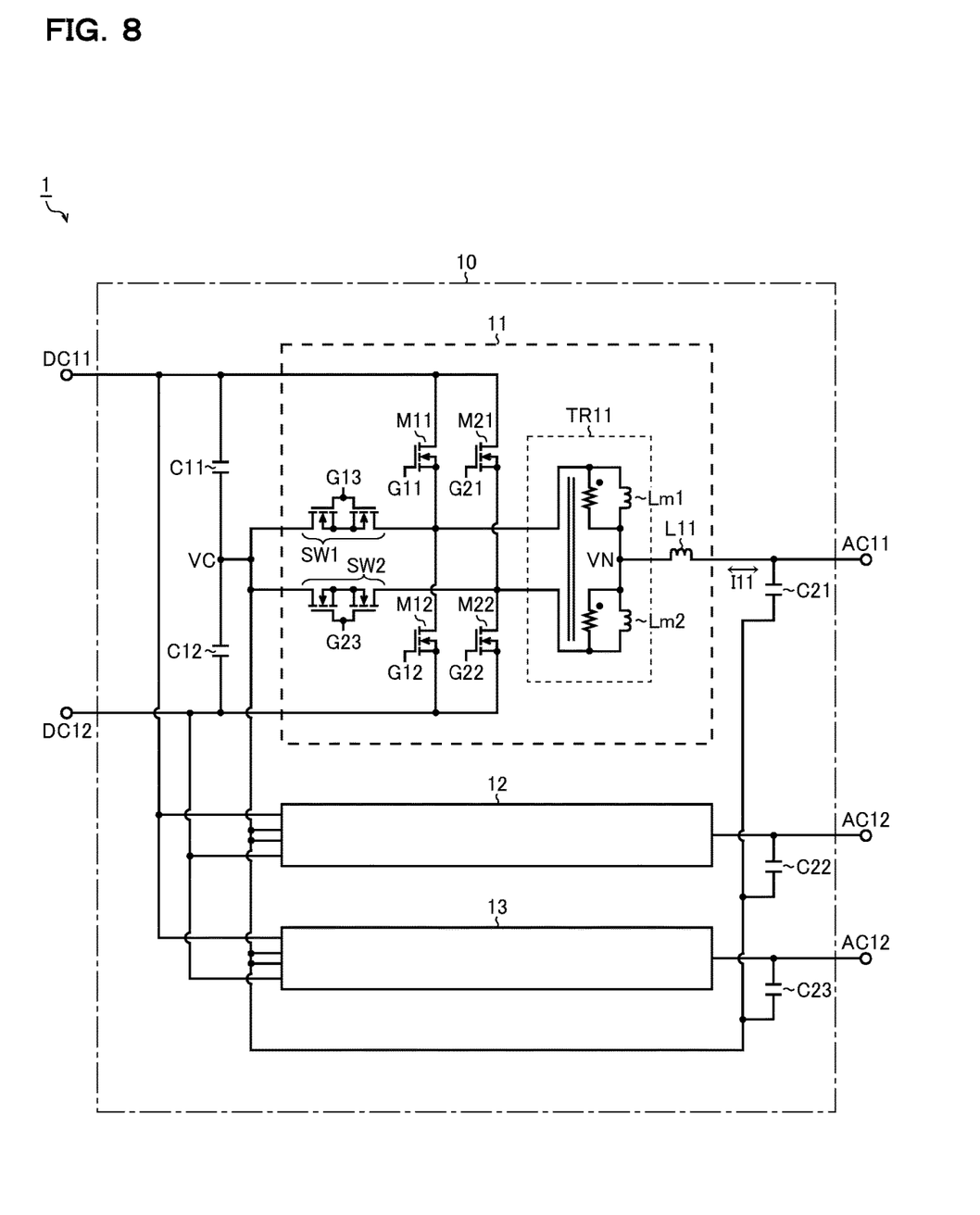
FIG. 8 is a diagram showing one example of an electric power conversion device according to a second embodiment.

FIG. 8 is a diagram showing one example of an electric power conversion device according to a second embodiment. In the electric power conversion device 11 of the second embodiment, as the switching circuit 10, a bidirectional inverter of a three-phase TL-NPC (trans-linked neutral-point-clamped) type is used.

Specifically, the switching circuit 10 includes, for example, capacitors C11 and C12, switch circuit blocks 11 to 13 in a three-phase configuration, and capacitors C21 to C23.

The switching circuit block 11 includes transistors M11 and M12 (of an re-channel type), transistors M21 and M22 (of an n-channel type), bidirectional switches SW1 and SW2 (of an n-channel type), a transformer TR11, and a reactor L11.

The switching circuit blocks 12 and 13 are each configured similarly to the switching circuit block 11, and therefore no overlapping description will be repeated. In FIG. 8, for the sake of convenience of illustration, the driving circuit 20 and the digital control device 100 are omitted from illustration, but these will be described in detail later.

The capacitors C11 and C12 are connected in series between the nodes DC11 and DC12, and functions as a capacitor bridge in which the connection node between the capacitors C11 and C12 serves as an alternating-current neutral point (i.e., an application terminal for a neutral-point voltage VC). In a case where the capacitors C11 and C12 have an equal capacitance value, VC=(DC11−DC12)/2.

The drain of the transistor M11 is connected to the node DC11. The source of the transistor M11 is connected to the drain of the transistor M12. The source of the transistor M12 is connected to the node DC12. The respective gates of the transistors M11 and M12 are fed with gate signals G11 and G12 respectively. The transistors M11 and M12 are respectively on when the gate signals G11 and G12 are at high level, and are respectively off when the gate signals G11 and G12 are at low level. Thus the transistors M11 and M12 are connected in series between the DC11 and DC12, and function as a first transistor bridge.

The drain of the transistor M21 is connected to the node DC11. The source of the transistor M21 is connected to the drain of the transistor M22. The source of the transistor M22 is connected to the node DC12. The respective gates of the transistors M21 and M22 are fed with gate signals G21 and G22 respectively. The transistors M21 and M22 are respectively on when the gate signals G21 and G22 are at high level, and are respectively off when the gate signals G21 and G22 are at low level. Thus the transistors M21 and M22 are connected in series between the DC11 and DC12, and function as a second transistor bridge.

The first transistor bridge (i.e., the transistors M11 and M12) and the second transistor bridge (the transistors M21 and M22) are driven with a predetermined phase difference θ (e.g., a phase difference corresponding to one half of the period, i.e., θ=π(180°)) between them.

The bidirectional switch SW1 is connected between the midpoint node of the capacitor bridge (i.e., the connection node between the capacitors C11 and C12) and the output node of the first transistor bridge (i.e., the connection node between the transistors M11 and M12). The gate of the bidirectional switch SW1 is fed with a gate signal G13. The bidirectional switch SW1 is on when the gate signal G13 is at high level, and is off when the gate signal G13 is at low level.

The bidirectional switch SW2 is connected between the midpoint node of the capacitor bridge (i.e., the connection node between the capacitors C11 and C12) and the output node of the second transistor bridge (i.e., the connection node between the transistors M21 and M22). The gate of the bidirectional switch SW2 is fed with a gate signal G23. The bidirectional switch SW2 is on when the gate signal G23 is at high level, and is off when the gate signal G23 is at low level.

The transformer TR11 is connected between, at one end, the respective output nodes of the first and second transistor bridges and, at the other end, the first terminal of the reactor L11. The second terminal of the reactor L11 is connected to the node AC11.

Figure 9:
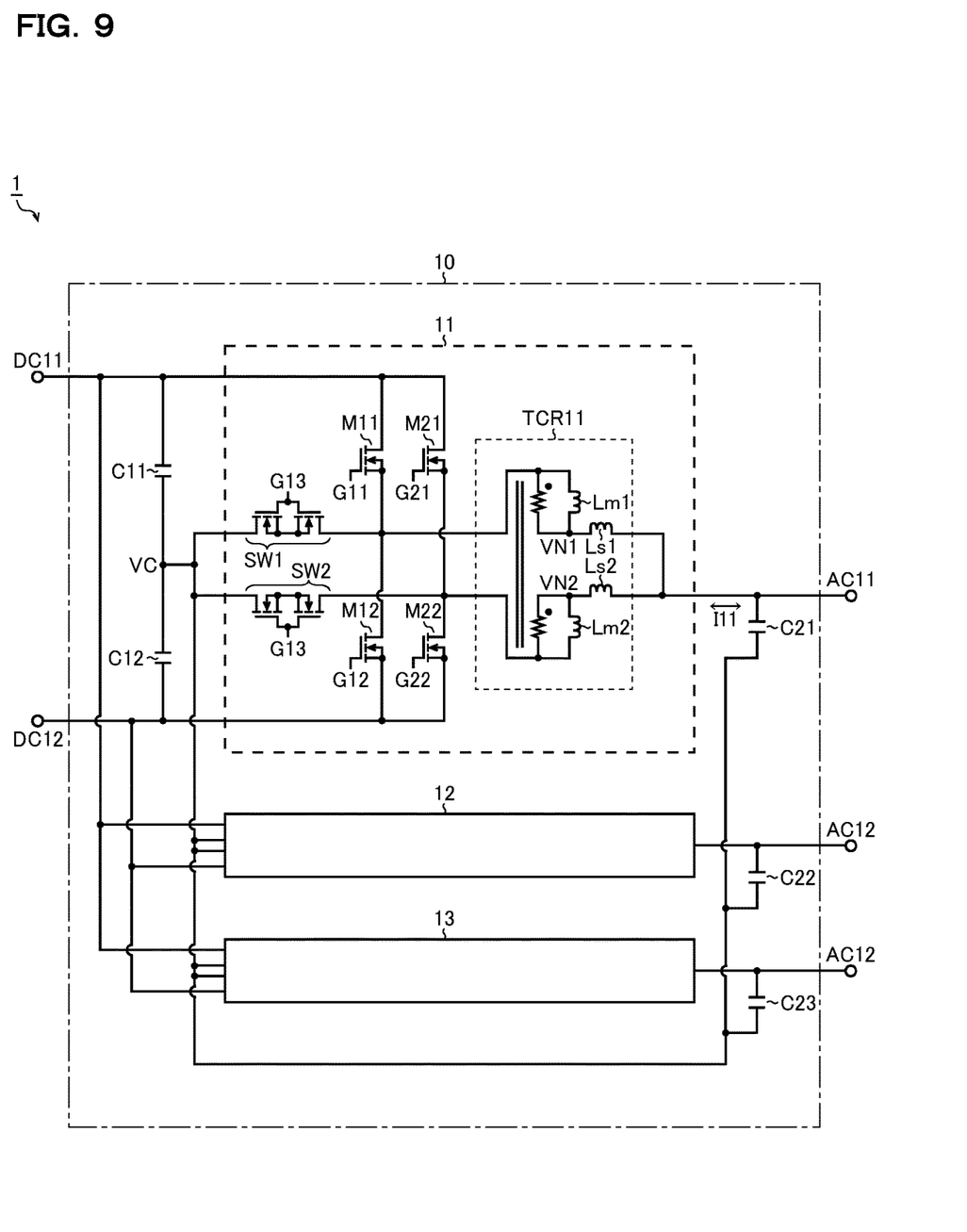
FIG. 9 is a diagram showing one modified example of the second embodiment.

In a case where the excitation inductances Lm1 and Lm2 of the transformer TR11 are sufficiently high compared with the reactor L11, the transformer TR11 and the reactor L11 can be configured as a transformer-coupled reactor TCR11 (FIG. 9) that has the functions of both of them. In that case, the reactor L11 is formed by the leakage inductances Ls' and Ls2 of the transformer-coupled reactor TCR11. The node voltages VN1 and VN2 that appear between the coupled part of the transformer-coupled reactor TCR11 and the leakage inductances Ls1 and Ls2 respectively have a potential substantially equal to the node voltage VN that appears at the midpoint node of the transformer TR11.

The capacitors C21 and C23 are respectively connected between, at one end, the nodes AC11 to AC13 and, at the other end, the midpoint node of the capacitor bridge (i.e., the connection node between the capacitors C11 and C12).

With the electric power conversion device 1 of this embodiment, it is possible to change the switching output level of the transistor bridge not between two levels (+E and −E) of H and L but in multiple steps so that it can have three (+E, 0, and −E) or more graded levels. It is thus possible to reduce the voltage applied to the reactor L11, and hence to achieve, with respect to the reactor L11, size reduction and loss reduction as well as noise reduction. It is also possible to reduce the voltages applied to the transistors, and hence to use low-withstand-voltage elements readily available in the market and to reduce switching loss.

In particular, today, electric power conversion devices are employed in a wide variety of fields, not only in household and industrial appliances but also in vehicle-mounted appliances. In such applications, electric power conversion devices are expected to be compact, lightweight, and highly efficient, and the expectations are higher the higher power those devices are intended for. This makes the electric power conversion device 1 of this embodiment suitable.

Figure 10:
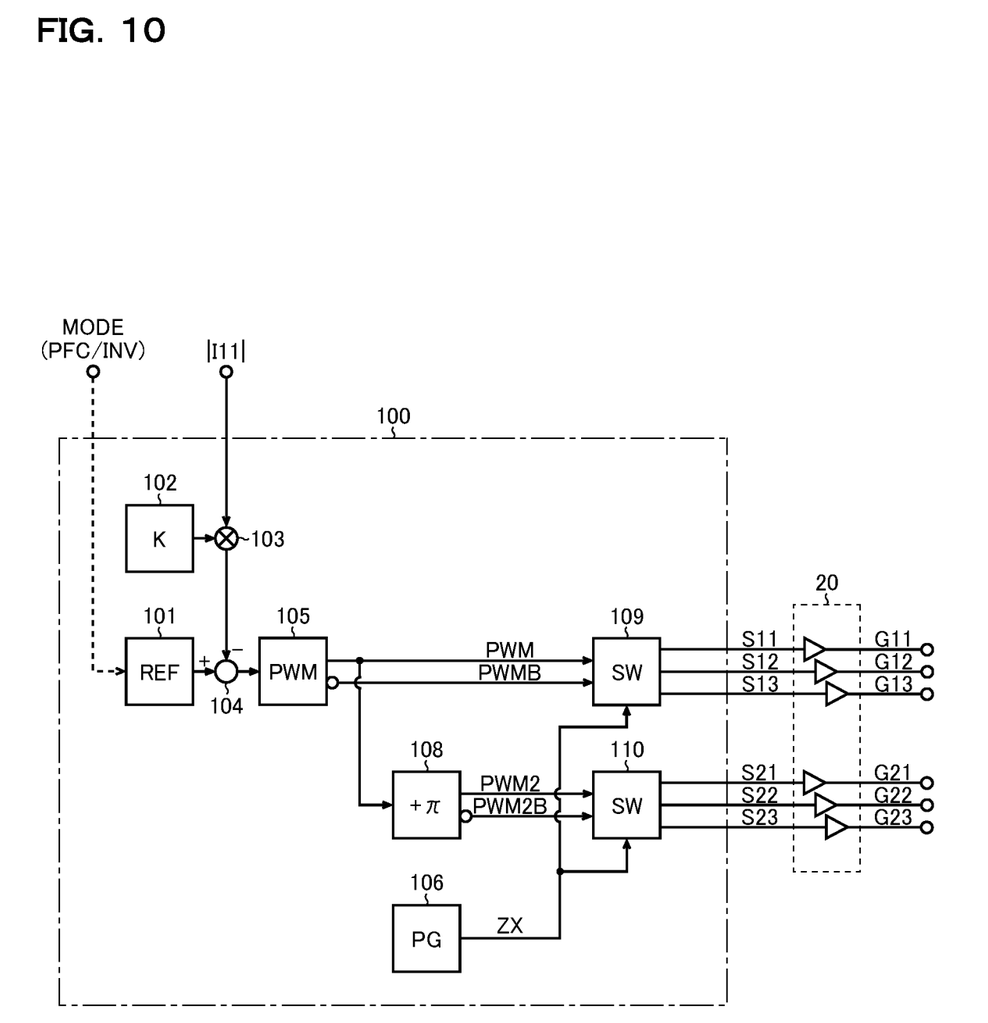
FIG. 10 is a diagram showing one configuration example of a control device used in the second embodiment.

FIG. 10 is a diagram showing one configuration example of the digital control device 100 used in the electric power conversion device 1 of the second embodiment. The digital control device 100 of this configuration example is based on that in the first embodiment (FIG. 1), but has a modification made in the final stage of the pulse width modulator 105. More specifically, the digital control device 100 of this configuration example includes, in place of the signal switcher 107 described previously, a phase shifter 108 and signal switchers 109 and 110.

The phase shifter 108 shifts the phase of the pulse width modulation signal PWM by a predetermined phase difference θ (e.g., a phase difference corresponding to one half of the period, i.e., θ=π(180°)) to output a pulse width modulation signal PWM2 (and an inverted pulse width modulation signal PWM2B with the inverted logic level compared to it).

The signal switcher 109 switches the output destinations of the pulse width modulation signal PWM and the inverted pulse width modulation signal PWMB in accordance with the zero-cross signal ZX.

For example, when ZX=H, then S11=PWM, S12=L constantly, and S13=PWMB. Through this signal switching, when the alternating-current voltage has a positive polarity (ZX=H), the transistor M11 and the bidirectional switch SW1 are turned on and off complementarily, and the transistor M12 is kept off all the time.

On the other hand, when ZX=L, then S11=L constantly, S12=PWMB, and S13=PWM. Through this signal switching, when the alternating-current voltage has a negative polarity (ZX=L), the transistor M12 and the bidirectional switch SW1 are turned on and off complementarily, and the transistor M11 is kept off all the time.

The signal switcher 110 switches the output destinations of the pulse width modulation signal PWM2 and the inverted pulse width modulation signal PWM2B in accordance with the zero-cross signal ZX.

For example, when ZX=H, then S21=PWM, S22=L constantly, and S23=PWMB. Through this signal switching, when the alternating-current voltage has a positive polarity (ZX=H), the transistor M21 and the bidirectional switch SW2 are turned on and off complementarily, and the transistor M22 is kept off all the time.

On the other hand, when ZX=L, then S21=L constantly, S22=PWMB, and S23=PWM. Through this signal switching, when the alternating-current voltage has a negative polarity (ZX=L), the transistor M22 and the bidirectional switch SW2 are turned on and off complementarily, and the transistor M21 is kept off all the time.

<Using Wide-Band-Gap Semiconductors (Sic, Gan)>

At least one of the different switching elements used in the electric power conversion device 1, namely the transistors M1 to M4 in FIG. 1, the transistors M11 to M12 and M21 to M22 in FIG. 8 (and FIG. 9), and the bidirectional switches SW1 and SW2, may be formed of a wide-band-gap semiconductor (such as a SiC-based semiconductor or a GaN-based semiconductor).

Compared with a switching element formed of a Si-based semiconductor, a switching element formed of a SiC-based semiconductor (such as a SiC-MOSFET), a GaN-based semiconductor (such as a GaN-HEMT [high-electron-mobility transistor]), or the like helps reduce parasitic capacitances such as output capacitance and feedback capacitance, and thus helps suppress an increase in switching loss in high-frequency driving.

Using a SiC-MOSFET as any of the above-mentioned switching elements provides a low on-state resistance combined with high thermal conductivity owing to a vertical structure. It is thus possible to obtain a high-current, high-power electric power conversion device 1.

Moreover, a SiC-MOSFET has a low reverse recovery current in the body diode and in addition has low parasitic capacitances; it thus helps hold the effective current value low, and helps reduce conduction loss in switching elements and patterns as well as copper loss in a transformer-coupled reactor.

As described above, a switching element formed of a wide-band-gap semiconductor, despite having a high withstand voltage, has a low on-state resistance and a low switching loss, and in addition retains those tendencies relatively well at high temperatures. Accordingly it can operate in a sufficiently tolerable manner from a thermal perspective in applications where the input voltage and the voltages applied directly to switching elements are high.

Further Modifications

The various technical features disclosed herein may be implemented in any other manners than in the embodiments described above, and allow for any modifications made within the spirit of their technical ingenuity. For example, any bipolar transistor may be replaced with a MOS field-effect transistor and vice versa; the logic levels of any signal may be inverted. That is, the embodiments described above should be considered to be in every aspect illustrative and not restrictive, and the technical scope of the present invention should be understood to be defined not by the description of the embodiments given above but by the appended claims and to encompass any modifications made in a sense and scope equivalent to the claims.

INDUSTRIAL APPLICABILITY

The electric power conversion devices disclosed herein find wide applications in a wide variety of fields, not only in household and industrial appliances but also in vehicle-mounted appliances.

LIST OF REFERENCE SIGNS 1 electric power conversion device
10 switching circuit (bidirectional inverter)
11-13 switching circuit block
20 driving circuit
21-24 gate driver
100 digital control device
101 reference signal setter
102 coefficient setter
103 multiplier
104 adder
105 pulse width modulator
106 zero-cross detector
107 signal switcher
108 phase shifter 109, 110 signal switcher
AC1, AC2, AC11-AC13 node (AC node)
C1, C2, C11, C12, C12-C23 capacitor
DC1, DC2, DC11, DC12 node (DC node)
E1, E2 power source
L1 inductor
L11 reactor
Lm1, Lm2 excitation inductance
Ls1, Ls2 leakage inductance
M1-M4, M11, M12, M21, M22 transistor
SW1, SW2 bidirectional switch
TCR11 transformer-coupled reactor
TR11 transformer
Z1, Z2 load

The invention claimed is:

1. An apparatus comprising:
a control device configured to serve as a principal controlling agent in an electric power conversion device incorporating a switching circuit configured to be a bidirectional inverter, the control device configured to subtract, from a reference signal that is determined in accordance with an operation mode of the electric power conversion device, a multiplied signal obtained by multiplying a control-target current of the switching circuit by a prescribed coefficient to generate, based on a result of the subtraction, a control signal for controlling the bidirectional inverter;
wherein the bidirectional inverter includes:
a capacitor bridge configured to include at least two capacitors connected in series between first and second DC nodes;
first and second transistor bridges each configured to include two transistors connected in series between the first and second DC nodes;
first and second bidirectional switches configured to be connected between a midpoint node of the capacitor bridge and output nodes of the first and second transistor bridges respectively;
a transformer configured to be connected to the output nodes of the first and second transistor bridges;
a reactor configured to be connected between the transformer and an AC node; and
a capacitor configured to be connected between the AC node and the midpoint node of the capacitor bridge,
wherein the first and second transistor bridges are configured to be operated with a 180 degree phase difference therebetween.

2. The apparatus according to claim 1, wherein the switching circuit is also operable for power factor correction (PFC), in which the reference signal has a constant value, and the control-target current is an input current.

3. The apparatus according to claim 2, wherein the control device is further configured to superimpose on the reference signal a modulation signal for generating a distortion in the input current.

4. The apparatus according to claim 1, wherein the switching circuit is operable for an inverter operation, in which, the reference signal is a sine wave signal, and the control-target current is an output current.

5. The apparatus according to claim 4, wherein the control device is further configured to superimpose on the reference signal a modulation signal for canceling out a distortion in a load current passing from a commercial power source through another load.

6. The apparatus according to claim 4, wherein
a frequency of the reference signal is a frequency required in the output current, and
the coefficient is a value that makes the multiplied signal lower than the reference signal.

7. The apparatus according to claim 1, wherein
a waveform of the reference signal is changed when an energizing direction is switched so that, during AC-DC conversion, the reference signal has a constant value and, during DC-AC conversion, the reference signal is a sine wave signal, and
as the control-target current, a current passing at a same node in the switching circuit is configured to be monitored both during AC-DC and DC-AC conversion such that the control-target current is an input current during AC-DC conversion and is an output current during DC-AC conversion.

8. The apparatus according to claim 1, wherein the first and second transistor bridges, the first and second bidirectional switches, the transformer, the reactor, and the capacitor are configured in three phases.

9. The apparatus according to claim 1, wherein the transformer and the reactor are configured as a transformer-coupled reactor having functions of both thereof.

10. The apparatus according to claim 1, wherein each of the two transistors of each of the first and second transistor bridges, and the first and second bidirectional switches, is formed of a wide-band-gap semiconductor.

11. An electric power conversion device, comprising:
a bidirectional inverter; and
a control device configured to serve as a principal controlling agent in the bidirectional inverter,
wherein the control device is configured to subtract, from a reference signal that is determined in accordance with an operation mode of the electric power conversion device, a multiplied signal obtained by multiplying a control-target current of the switching circuit by a prescribed coefficient to generate, based on a result of the subtraction, a control signal for controlling the bidirectional inverter, and
wherein the bidirectional inverter comprises:
a capacitor bridge configured to include at least two capacitors connected in series between first and second DC nodes;
first and second transistor bridges each configured to include two transistors connected in series between the first and second DC nodes;
first and second bidirectional switches configured to be connected between a midpoint node of the capacitor bridge and output nodes of the first and second transistor bridges respectively;
a transformer configured to be connected to the output nodes of the first and second transistor bridges;
a reactor configured to be connected between the transformer and an AC node; and
a capacitor configured to be connected between the AC node and the midpoint node of the capacitor bridge,
wherein the first and second transistor bridges are configured to be operated with a 180 degree phase difference therebetween.

* * * * *